United States Patent [19]

Kimmich et al.

[11] Patent Number: 4,852,966
[45] Date of Patent: Aug. 1, 1989

[54] OPTICAL CABLE ELEMENT AND OPTICAL CABLE

[75] Inventors: Klaus Kimmich, Stuttgart; Ferdinand Groegl, Oberstenfeld, both of Fed. Rep. of Germany

[73] Assignee: Alcatel NV, Amsterdam, Netherlands

[21] Appl. No.: 169,380

[22] Filed: Mar. 17, 1988

[30] Foreign Application Priority Data

Mar. 20, 1987 [DE] Fed. Rep. of Germany ....... 3709170

[51] Int. Cl.$^4$ ............................................. G42B 6/44
[52] U.S. Cl. ............................ 350/96.23; 350/96.24
[58] Field of Search ............................ 350/96.23, 96.24

[56] References Cited

U.S. PATENT DOCUMENTS

| | | | |
|---|---|---|---|
| 4,078,853 | 3/1978 | Kempf et al. | 350/96.23 |
| 4,146,302 | 3/1979 | Jachimowicz | 350/96.23 |
| 4,190,319 | 2/1980 | Eggleston | 350/96.23 |
| 4,239,335 | 12/1980 | Stiles | 350/96.23 |
| 4,241,979 | 12/1980 | Gagen et al. | 350/96.23 |
| 4,557,560 | 12/1985 | Bohannon, Jr. et al. | 350/96.23 |
| 4,695,128 | 9/1987 | Zimmerman et al. | 350/96.23 |
| 4,767,184 | 8/1988 | Ogasawara et al. | 350/96.23 |

*Primary Examiner*—Frank Gonzalez
*Attorney, Agent, or Firm*—Peter C. Van Der Sluys

[57] ABSTRACT

Optical cable elements are disclosed which consist of a corrugated sheet (4) having tapelike sheets (2, 3) secured to both sides by adhesive and optical waveguides (5) movably disposed in the hollow spaces between the corrugated sheet (4) and the tapelike sheets (2, 3). Two such cable elements are wound helically in opposite directions to form a stable tube which may contain a central strength member and/or be filled with a filling compound. Also described are optical cables in which the cable core contains one or more such tubes.

42 Claims, 3 Drawing Sheets

OPTICAL CABLE ELEMENT AND OPTICAL CABLE

The present invention relates to a cabling element as set forth in the preamble of claim 1 and to an optical cable comprising at least one such cabling element.

U.S. Patent No. 4,146,302 discloses an optical cable in which a tube contains a helical cabling element consisting of two strips between which several optical waveguides are secured by adhesive to protect them from external mechanical stress. Nevertheless, the optical waveguides may be stressed by mechanical tension and microbends, because they are secured to the strips. Cabling the cabling element is expensive since a stable cable element is formed by surrounding the cabling element with an extruded protective tube or a multilayer covering.

The object of the present invention is to provide an optical cable and a cabling element which are easy to manufacture.

This object is attained by the means set forth in claim 1. Further advantageous aspects of the invention are contained in the subclaims.

The novel cabling element has the advantage that the optical waveguides contained therein with a high packing density are not mechanically stressed during the manufacture and cabling of the cabling element, because the optical waveguides are mechanically separated from the sheets. Furthermore, a mechanically stable cable element can be easily formed with the cabling element.

The invention will now be described with the aid of embodiments. In the accompanying drawing, FIG. 1 shows a cross section through a first cabling element;

Further embodiments will be pointed out as the description proceeds.

Figure 1:
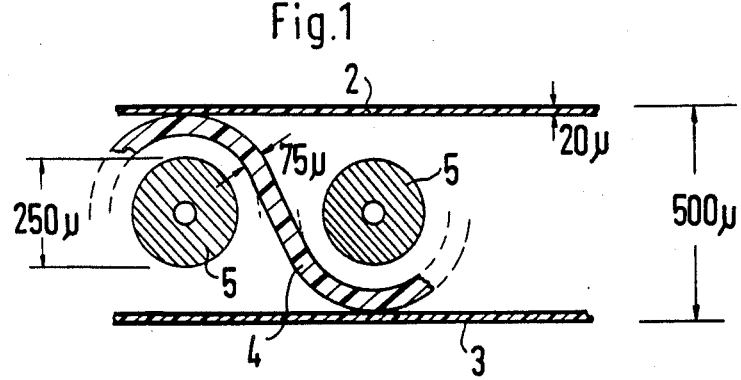

The first optical cabling element, shown in FIG. 1, consists of two tapelike sheets 2, 3, a corrugated sheet 4, and a number of optical waveguides 5, of which only two are shown. The tapelike sheets 2, 3 are 0.02 mm thick, for example, and are secured to the corrugated sheet 4 by adhesive. The corrugated sheet 4 is made of polyester, polyethylene terephthalate, or polybutylene terephthalate and is 0.075 mm thick, for example. Optical waveguides 5 are loosely carried in the hollow spaces between the corrugated sheet 4 and the tapelike sheets 2, 3. If the optical waveguides 5 are 0.25 mm in diameter, an optical cabling element with a width of about 11 mm and a thickness of about 0.5 mm can accommodate 16 optical waveguides.

Figure 2:
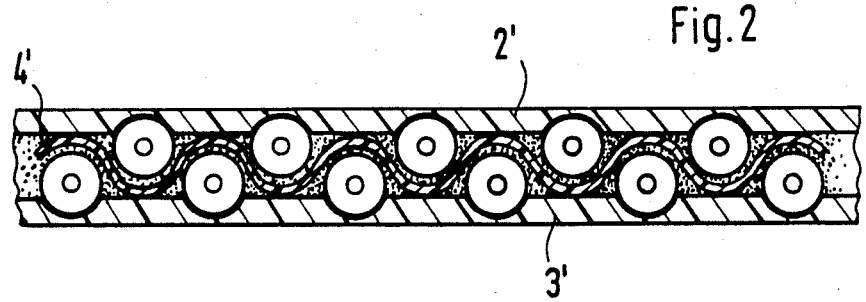
FIG. 2 shows a cross section through a second cabling element.

The second optical cabling element, shown in FIG. 2, differs from that of FIG. 1 in that it uses a corrugated sheet 4' with flatter corrugations, so that the optical waveguides 5 project beyond the ridges of the corrugations. The tapelike sheets 2', 3' are laminated expanded sheets which slightly press the optical waveguides into the grooves of the corrugations.

Figure 4:
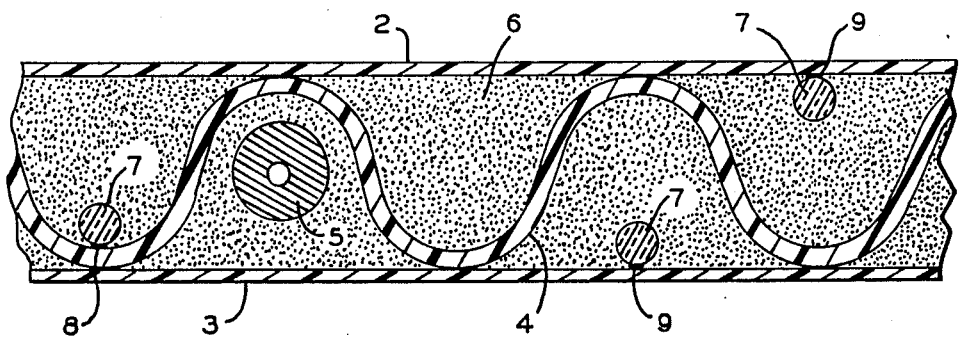
FIG. 4 shows a cross section through another embodiment of a cabling element.

In other embodiments as shown in FIG. 4, the optical waveguides are embedded in a filling compound 6, such as silicone, so that the optical cabling elements are sealed against the passage of water lengthwise therethrough.

In further embodiments as shown in FIG. 4, some optical waveguides are replaced by tensionproof and/or axial-compression-resistant members 7 which are secured to the corrugated sheet 4, 4' as at 8 and/or the tapelike sheets 2, 2', 3, 3' as at 9 by adhesive. This is preferably done by filling the respective hollow space with a thermosetting adhesive. Suitable tensionproof members are glass or aramid filaments. Suitable tensionproof and axial-compression-resistant members are filaments of glass- or aramid-fiber-reinforced plastic or a liquid-crystal polymer.

Figure 5:
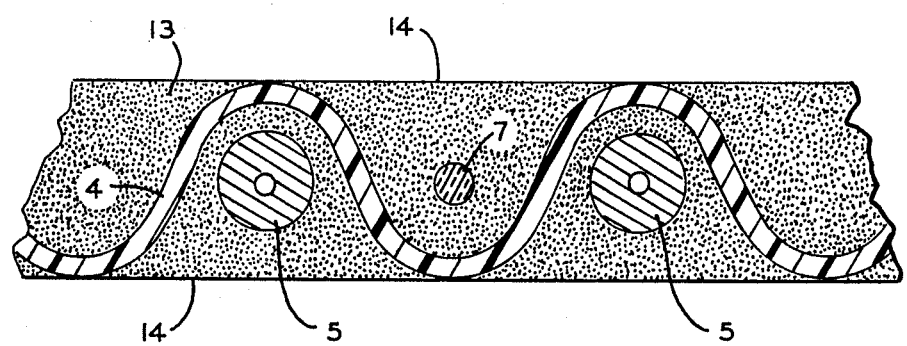
FIG. 5 shows a cross section through another embodiment of a cabling element.

In a third optical cabling element shown in FIG. 5, the grooves of a corrugated sheet are filled on both sides with an embedding compound 13 in which the optical waveguides 5 and any tensionproof and/or axial-compression-resistant members 7 are embedded. The embedding compound is a material with a very low modulus of elasticity, and is sealed, e.g., by a coat of lacquer 14, or cured by ultraviolet radiation at the surface of the cabling element.

Figure 3:
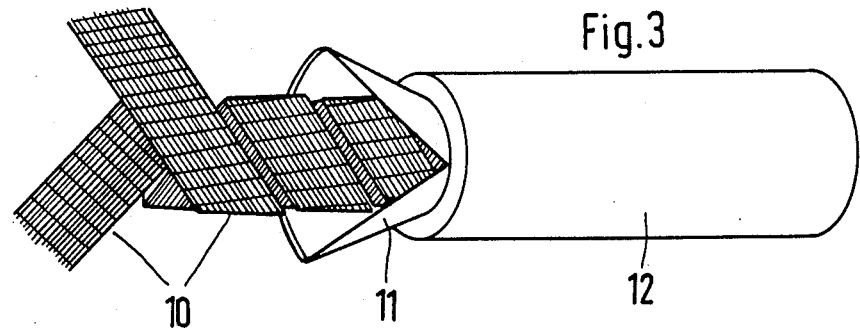
FIG. 3 shows a cable.
Figure 6:
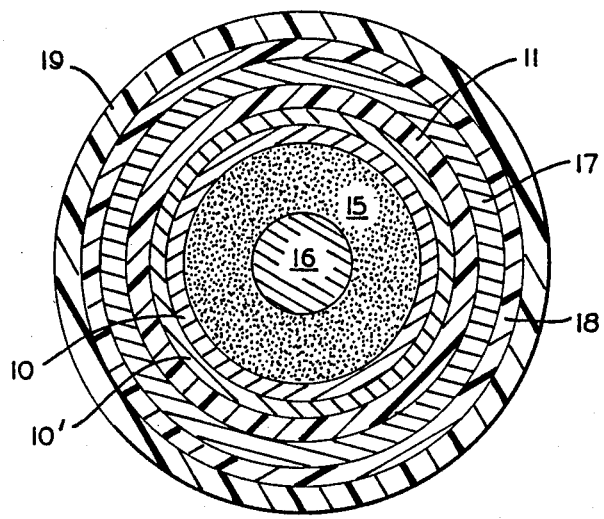
FIG. 6 shows a cross section of a cable.

FIG. 3 shows an optical cable in which two optical cabling elements 10 are formed into a stable tube by the hollow-tube-winding technique. The elements 10 are helically wound one over the other, preferably in opposite directions. The tube is surrounded by a swellable tape 11, which is enclosed by a tensionproof cable jacket 12. The swellable tape serves to provide protection against the lengthwise passage of water and can be omitted if such protection is not needed. In other embodiments of the cable, only one optical cabling element 10 and an additional sheet 10' are wound into a tube. The winding can be effected with an overlap, with a butt seam, or with a gap. The tube may be filled with a filling compound 15 which may be a swellable material and/or contain a tensionproof and/or axial-compression-resistant central member 16 as shown in FIG. 6.

In further embodiments of the cable, consists of two or more tubes formed from optical cabling elements 10 or from optical cabling elements 10 and sheets and surrounded by a common core wrap. Preferably, the tubes are stranded in layers around a tensionproof and/or axial-compression-resistant central member 16 as shown in FIG. 6.

The tensionproof cable jacket 12 preferably consists of an aluminum or steel tape 17 coated on both sides with a copolymer, a tensionproof tape 18 surrounding the aluminum or steel tape and made of aramid- and/or glass-fiber-reinforced plastic or a liquid-crystal polymer, and a plastic covering 19, with the tensionproof tape secured to the aluminum or steel tape and the plastic covering by adhesive.

Figure 7:
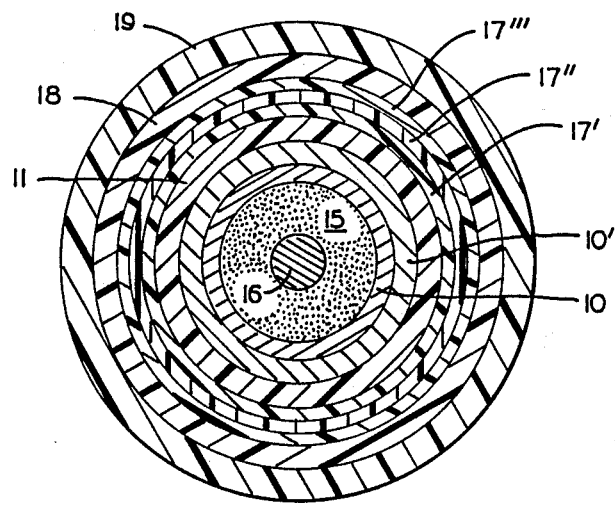
FIG. 7 shows a cross section of another embodiment of a cable.

The metal tape may be replaced by a three-layer plastic blocking sheet 17 whose middle layer 17" is made of polyethylene teraphthalate, and whose other layers 17', 17" are made of polyethylene as shown in FIG. 7.

We claim:

1. Ribbonlike optical cabling element comprising two tapelike sheets between which a number of optical waveguides are arranged parallel to each other, characterized in that a corrugated structural sheet (4) is provided between the tapelike sheets to define a plurality of adjacent hollow spaces (2, 3), and that the optical waveguides (5) are arranged in at least some of the hollow spaces between the corrugated sheet (4) and the tapelike sheets (2, 3) whereby the corrugated structural sheet provides protective spaces for the optical waveguides.

2. A cabling element as claimed in claim 1, characterized in that the corrugated sheet (4) is secured to the tape-like sheets (2, 3) by adhesive.

3. A cabling element as claimed in claim 1, characterized in that the optical waveguides (5) are loosely carried in the hollow spaces.

4. A cabling element as claimed in claim 1, characterized in that the remaining hollow spaces are filled with an embedding compound.

5. A cabling element as claimed in claim 1, characterized in that part of the hollow spaces contain tensionproof members which are secured to at least one of said corrugated sheet (4) and the tape-like sheet (2, 3) by adhesive.

6. Ribbonlike optical cabling element, comprising corrugated structural sheet whose grooves provide protective hollow channels on both sides with an embedding compound in which optical waveguides are embedded, said embedding compound being sealed at the surface of the cabling element, whereby the corrugated structural sheet provides protective spaces for the optical waveguides.

7. A cabling element as claimed in claim 6, characterized in that tensionproof members are additionally embedded in the embedding compound.

8. A ribbonlike optical cabling element, comprising two laminated expanded sheets between which a number of optical waveguides are arranged parallel to each other, characterized in that a corrugated sheet is provided between the laminated expanded sheets to define a plurality of adjacent hollow spaces and that the optical waveguides are arranged in at least some of the hollow spaces between the corrugated sheet and the laminated expanded sheets, said laminated expanded sheets engaging said waveguides and forcing them into the hollow spaces.

9. A ribbonlike optical cabling element, comprising two tapelike sheets between which a number of optical waveguides are arranged parallel to each other, characterized in that a corrugated sheet is provided between the tapelike sheets and that the optical waveguides are arranged in at least some of the hollow spaces between the corrugated sheet and the tapelike sheets, said cabling element forming a helix and additionally including a tapelike sheets helically wound in the opposite direction of the winding of the cabling element, so that said sheet and cabling element form a stable tube.

10. An optical cable element as claimed in claim 9, characterized in that the tube is wrapped with a swellable tape.

11. An optical cable element, as described in claim 10, additionally comprising a tensionproof cable jacket.

12. An optical cable element as claimed in claim 19, wherein the tube is filled with a filling compound.

13. An optical cable element as claimed in claim 9, characterized in that the tube contains a swellable core.

14. An optical cable element, as described in claim 13, additionally comprising a tensionproof cable jacket.

15. A cabling element, as described in claim 9, additionally comprising a tensionproof cable jacket formed about said tube.

16. An optical cable as claimed in claim 15, characterized in that the cable jacket comprises a metal tape, a tensionproof tape of glass-fiber and/or aramid-fiber-reinforced plastic or a liquid-crystal polymer and a plastic covering, with the tensionproof tape secured to the metal tape and the plastic covering by adhesive.

17. An optical cable as claimed in claim 15, characterized in that, the cable jacket includes a three-layer plastic blocking sheet whose middle layer is made of polyethylene terephthalate, and whose other layers are made of polyethylene.

18. An optical cable, as described in claim 15, additionally comprising a tensionproof and axial-compression-resistant central member formed inside said tube.

19. A ribbonlike optical cabling element, comprising a corrugated sheet whose grooves are filled on both sides with an embedding compound in which optical waveguides are embedded, and which is sealed at the surface of the cabling element, said cabling element forming a helix and additionally including a tapelike sheet helically wound in the opposite direction of the winding of the cabling element, said sheet and cabling element forming a stable tube.

20. An optical cable element, as described in claim 19, characterized in that the tube is wrapped with a swellable tape.

21. An optical cable element, as described in claim 20, additionally comprising a tensionproof cable jacket.

22. An optical cable element as claimed in claim 20, wherein the tube is filled with a filling compound.

23. An optical cable element, as described in claim 19, characterized in that the tube contains a swellable core.

24. An optical cable element, as described in claim 23, additionally comprising a tensionproof cable jacket.

25. A cabling element, as described in claim 19, additionally comprising a tensionproof cable jacket formed about said tube.

26. An optical cable, as described in claim 25, additionally comprising a tensionproof and axial-compression-resistant central member formed inside said tube.

27. A ribbonlike optical cabling element, comprising two tapelike sheets between which a number of optical waveguides are arranged parallel to each other, characterized in that a corrugated sheet is provided between the tapelike sheets and that the optical waveguides are arranged in at least some of the hollow spaces between the corrugated sheet and the tapelike sheets, said cabling element being helically wound and additionally comprising a second identical cabling element disposed over the first cabling element and helically wound in an opposite direction to form a stable tube.

28. An optical cable element, as described in claim 27, characterized in that the tube is wrapped with a swellable tape.

29. An optical cable element, as described in claim 28, additionally comprising a tensionproof cable jacket.

30. An optical cable element as claimed in claim 28, wherein the tube is filled with a filling compound.

31. An optical cable element, as described in claim 27, characterized in that the tube contains a swellable core.

32. An optical cable element, as described in claim 31, additionally comprising a tensionproof cable jacket.

33. A cabling element, as described in claim 27, additionally comprising a tensionproof cable jacket formed about said tube.

34. An optical cable, as described in claim 33, additionally comprising a tensionproof and axial-compression-resistant central member formed inside said tube.

35. A ribbonlike optical cabling element, comprising a corrugated sheet whose grooves are filled on both sides with an embedding compound in which optical waveguides are embedded, and which is sealed at the surface of the cabling element, said cabling element being helically wound and additionally comprising a second identical cabling element disposed over the first cabling element and helically wound in the opposite direction to form a stable tube.

36. An optical cable element, as described in claim 35, characterized in that the tube is wrapped with a swellable tape.

37. An optical cable element, as described in claim 36, additionally comprising a tensionproof cable jacket.

38. An optical cable element as claimed in claim 36, wherein the tube is filled with a filling compound.

39. An optical cable element, as described in claim 35, characterized in that the tube contains a swellable core.

40. An optical cable element, as described in claim 39, additionally comprising a tensionproof cable jacket.

41. A cabling element, as described in claim 35, additionally comprising a tensionproof cable jacket formed about said tube.

42. An optical cable, as described in claim 41, additionally comprising a tensionproof and axial-compression-resistant central member formed inside said tube.

* * * * *